(12) United States Patent
Rothschild

(10) Patent No.: US 11,525,929 B2
(45) Date of Patent: Dec. 13, 2022

(54) PASS-THROUGH X-RAY BACKSCATTER PERSONNEL SCANNER

(71) Applicant: Viken Detection Corporation, Burlington, MA (US)

(72) Inventor: Peter J. Rothschild, Newton, MA (US)

(73) Assignee: Viken Detection Corporation, Burlington, MA (US)

(*) Notice: Subject to any disclaimer, the term of this patent is extended or adjusted under 35 U.S.C. 154(b) by 0 days.

(21) Appl. No.: 17/269,859

(22) PCT Filed: Aug. 19, 2019

(86) PCT No.: PCT/US2019/046989
§ 371 (c)(1),
(2) Date: Feb. 19, 2021

(87) PCT Pub. No.: WO2020/041161
PCT Pub. Date: Feb. 27, 2020

(65) Prior Publication Data
US 2021/0173097 A1 Jun. 10, 2021

Related U.S. Application Data

(60) Provisional application No. 62/719,724, filed on Aug. 20, 2018.

(51) Int. Cl.
*G01T 1/167* (2006.01)
*G01N 23/203* (2006.01)
(Continued)

(52) U.S. Cl.
CPC .......... *G01T 1/167* (2013.01); *G01N 23/203* (2013.01); *G01T 1/203* (2013.01); *G01V 5/0025* (2013.01); *G01V 5/0075* (2013.01)

(58) Field of Classification Search
CPC .... G01T 1/167; G01N 23/203; G01V 5/0025; G01V 5/0075
See application file for complete search history.

(56) References Cited

U.S. PATENT DOCUMENTS 6,094,472 A * 7/2000 Smith ............... G01N 23/203
378/86
6,269,142 B1 * 7/2001 Smith ............... G01V 5/0025
378/57
(Continued)

FOREIGN PATENT DOCUMENTS

CN     103901056 A     7/2014
WO     2020/041161 A1  2/2020

OTHER PUBLICATIONS

International Search Report and Written Opinion for PCT/US2019/046989 dated Nov. 13, 2019, titled "Pass-Through X-Ray Backscatter Personnel Scanner".

(Continued)

*Primary Examiner* — David P Porta
*Assistant Examiner* — Jeremy S Valentiner
(74) *Attorney, Agent, or Firm* — Hamilton, Brook, Smith & Reynolds, P.C.

(57) ABSTRACT

A system for inspecting a moving person comprises an x-ray source, disposed in a fixed position with respect to the moving person, to generate one or more scanning x-ray beams. Each of the one or more x-ray beams being obliquely incident on either a front of the moving person, a rear of the moving person, or both. The system further comprises one or more backscatter detectors arranged to detect radiation scattered from the moving person, and to produce a detection signal therefrom. The system further comprises a processor and a memory with computer code instructions stored thereon. The memory is operatively coupled to the processor such that, when executed by the processor, the computer (Continued)

code instructions cause the system to produce a backscatter image based on the detection signal. When two or more x-ray beams are implemented, the two or more x-ray beams are temporarily interleaved to prevent crosstalk.

19 Claims, 12 Drawing Sheets

(51) Int. Cl.
*G01V 5/00* (2006.01)
*G01T 1/203* (2006.01)

(56) References Cited

U.S. PATENT DOCUMENTS

| | | | |
|---|---|---|---|
| 7,505,562 B2 | 3/2009 | Dinca | |
| 7,575,562 B2 | 3/2009 | Dinca | |
| 2010/0067654 A1* | 3/2010 | Kotowski | G01V 5/0025 378/57 |
| 2011/0274249 A1* | 11/2011 | Gray | G01V 5/0008 378/87 |
| 2015/0241368 A1* | 8/2015 | Chen | G01V 5/0091 378/62 |

OTHER PUBLICATIONS

International Preliminary Report on Patentability for PCT/US2019/046989 dated Feb. 23, 2021 titled "Pass-Through X-Ray Backscatter Personnel Scanner".

* cited by examiner

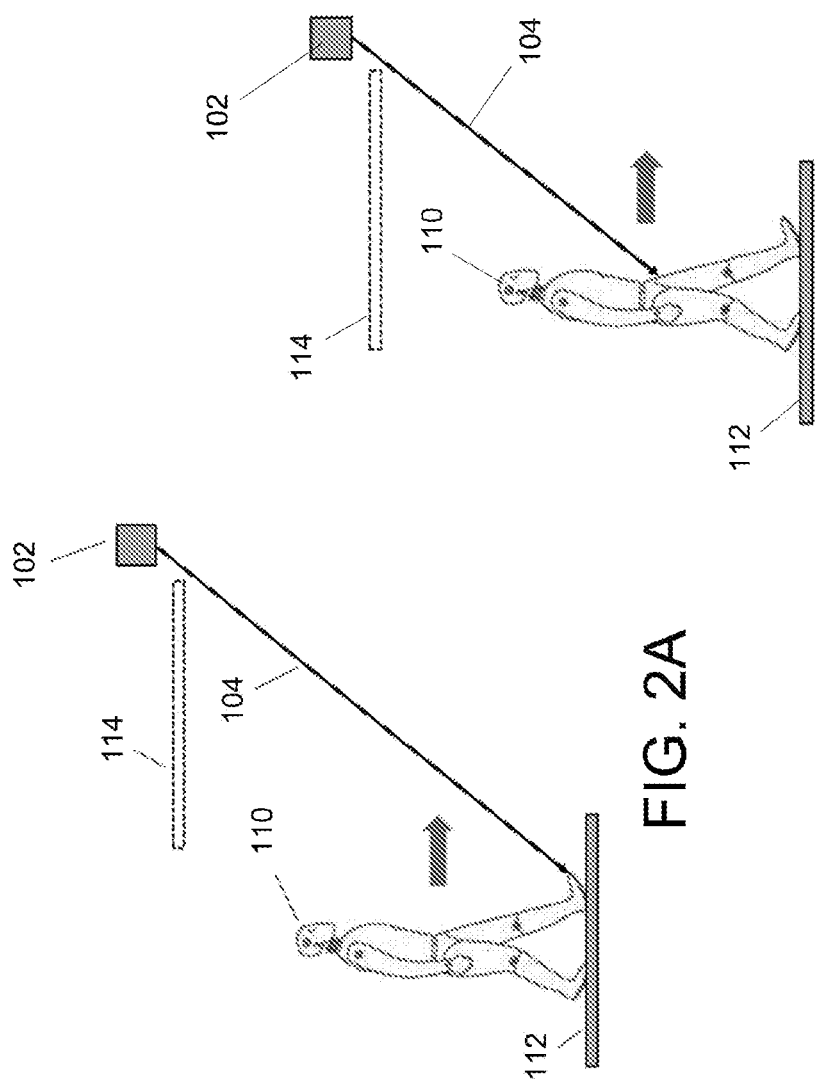

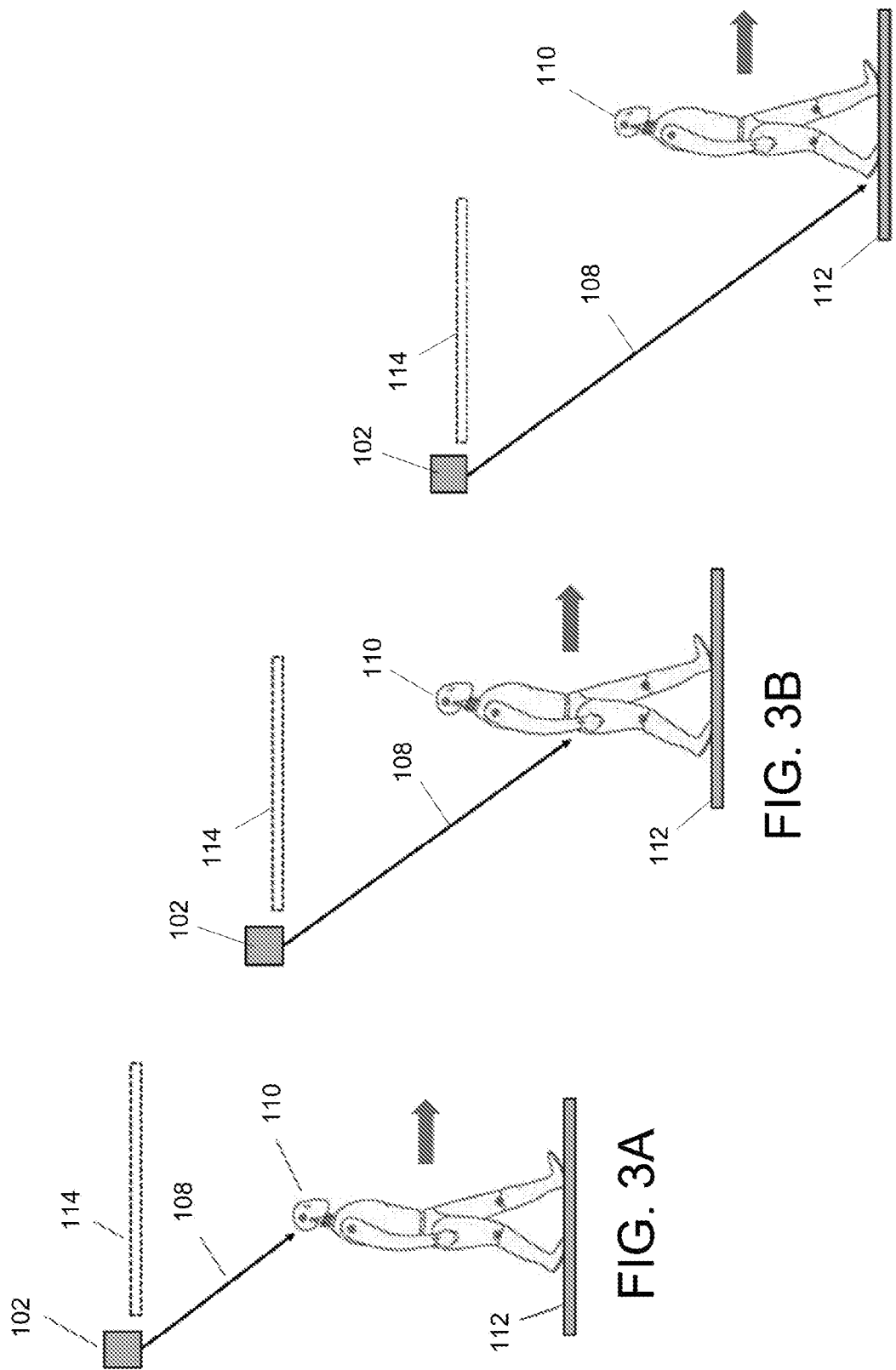

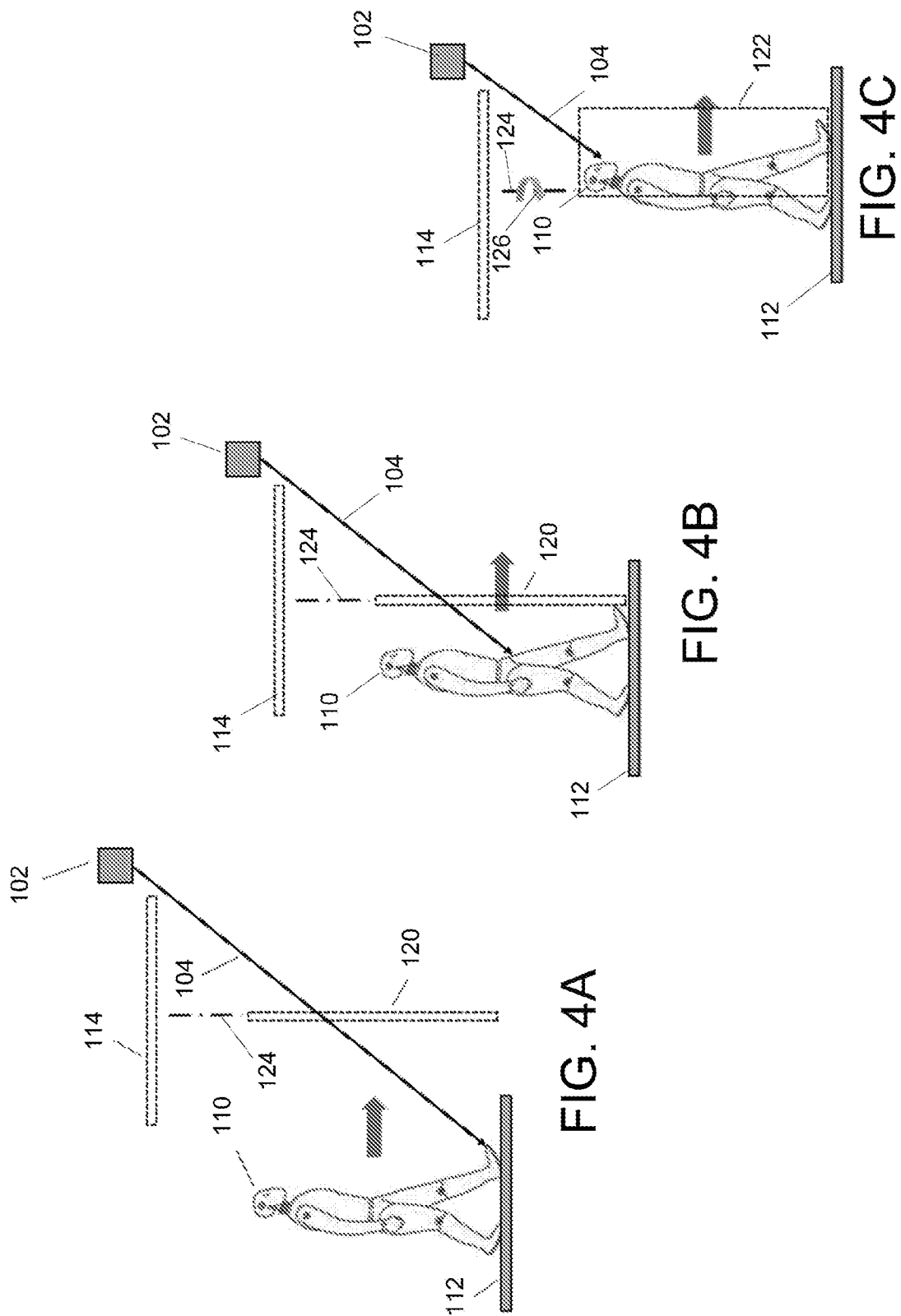

PASS-THROUGH X-RAY BACKSCATTER PERSONNEL SCANNER

RELATED APPLICATIONS

This application is the U.S. National Stage of International Application No. PCT/US2019/046989 filed Aug. 19, 2019, published in English, which claims the benefit of U.S. Provisional Application No. 62/719,724, filed on Aug. 20, 2018. The entire teachings of the above applications are incorporated herein by reference.

BACKGROUND

X-ray backscatter imaging has been used for detecting concealed contraband, such as drugs, explosives, and weapons, since the late 1980's. Unlike traditional transmission x-ray imaging that creates images by detecting the x-rays penetrating through an object, backscatter imaging uses reflected or scattered x-rays to create the image.

Prior art systems typically scan a person standing in a stationary position while the x-ray source produces a pencil beam of x-rays that scans in a horizontal plane while the x-ray source is moved up or down in the vertical direction. In this manner, the entire front (or back) of the person may be raster-scanned with the beam from the feet to the head, as the beam scans left-to-right and the x-ray source is translated vertically. This poses a problem with throughput, as the person must move into the system and remain standing still until the scan is completed. The person must then exit the system, and the next person is readied for scanning.

Another limitation of the system is size and cost. Because backscatter images must be acquired for both the front and rear sides of the person, two separate scanning x-ray sources must be used, along with two separate sets of backscatter detectors. These systems must be sequenced to prevent cross-talk between the two sources. Further, these prior-art systems are typically large and can take up a lot of valuable space in a crowded airport terminal or other scanning venue.

SUMMARY

The disclosed embodiments describe a pass-through backscatter x-ray system for imaging both the front and rear sides of a person using only one x-ray source. The person can either walk through the system without stopping, or as described in the example embodiments, be carried through on a conveyor belt designed for transporting people, such as those found in modern airports and railway stations around the world.

A system built according to the described embodiments does not require the person being imaged to stop or to be readied for scanning. In fact, the person can be transported through the system at speeds up to or even exceeding 1 m/second. This provides a very high throughput speed, allowing hundreds of people per hour to be scanned. Further, only one scanning x-ray source is needed to scan both the front and rear sides of the person as they pass through the system. The x-ray source is stationary, and does not need to be moved in the vertical direction as in prior-art systems. This removes the mechanical mechanisms needed to translate the x-ray source and also the associated complexities of providing high-voltage power and cooling to a non-stationary source.

The system can be positioned on a people mover or in an entrance doorway, and therefore requires no additional footprint in crowded locations. The system can be used covertly without the knowledge of those being inspected, and the system can additionally acquire transmission images with a stationary transmission detector that has a width only slightly larger than the width of the scanning beam.

In one aspect, the invention may be an inspection system, comprising a scanning region, an x-ray source, one or more backscatter detectors, and a controller. The scanning region may be configured to accommodate a scan subject to be inspected. The scanning region may include a pathway along which the scan subject passes during an inspection scan. The pathway may be delineated by a continuum of contours of the scan subject between a starting location and an ending location. The x-ray source may be disposed in a fixed position with respect to the scanning region, and configured to generate one or more scanning x-ray beams. Each of the scanning x-ray beams may be incident obliquely on either a front of the scan subject contours between the starting location and a middle location, or a rear of the scan subject contours between the middle location and the ending location. The one or more backscatter detectors may be arranged to detect radiation scattered from the scan subject, and to produce a scattered radiation signal therefrom. The controller may be configured to create at least one scatter image of the scan subject based at least on the scattered radiation signal.

A first one of the scanning x-ray beams may be incident obliquely on the front of the scan subject contours between the starting location and the middle location, and a second one of the x-ray scanning beams is incident on the rear of the scan subject contours between the middle location and the ending location.

The first scanning x-ray beam and the second scanning x-ray beam may be temporally interleaved. The x-ray source may comprise a single x-ray generating element that produces both the first one of the scanning x-ray beams and the second one of the x-ray scanning beams. The x-ray generating element may be an x-ray tube.

A chopper disk may be employed to create the one or more scanning x-ray beams. The chopper disk may comprise an odd number of slits, and regions of the chopper disk illuminated by x-rays may be configured to cooperate with the slits to facilitate temporal interleaving of the one or more scanning x-ray beams.

A conveyor may be configured to move the scan subject through the one or more scanning x-ray beams, thereby causing a scan of the scan subject to occur. The scan subject may be a person. One or more constraints may be configured to cause the person to walk through the one or more scanning x-ray beams, thereby causing a scan of the person to occur.

A transmission detector may measure a transmitted intensity of at least one of the one or more scanning x-ray beams. The backscatter detector(s) may be disposed across the pathway (i.e., impeding movement of the scan subject) during scanning, and disposed outside of the pathway (i.e., not impeding movement of the scan subject) after scanning completes.

The controller may comprise a processor and a memory with computer code instructions stored thereon. The memory may be operatively coupled to the processor such that, when executed by the processor, the computer code instructions cause the system to create the scatter image based on the scattered radiation signal, and to analyze the scatter image to detect presence of a threat item.

In another aspect, the invention may be a method of inspecting a scan subject. The method may comprise generating, by an x-ray source disposed in a fixed position with respect to the scan subject, one or both of a first scanning x-ray beam and a second scanning x-ray beam. The first scanning x-ray beam may be configured to be incident obliquely on the scan subject from a first direction, and the second scanning x-ray beam configured to be incident obliquely on the scan subject from a second direction. The method may further comprise causing the scan subject to pass through the first scanning x-ray beam such that as the scan subject moves, the first scanning x-ray beam intersects the scan subject from the first direction beginning at the bottom portion of the scan subject and progresses upwards on the scan subject, and the second scanning x-ray beam intersects the scan subject from the second direction beginning at the top portion of the scan subject and progresses downwards on the scan subject. The method may further comprise detecting, by one or more backscatter detectors, radiation scattered from the scan subject, and producing a scattered radiation signal therefrom, and creating a scatter image of the scan subject based at least on the scattered radiation signal.

The method may further comprise temporally interleaving the first scanning x-ray beam and the second x-ray scanning beam, and may generate the first scanning x-ray beam and the second x-ray scanning beam using a single x-ray generating element.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 2A, 2B, and 2C, illustrate front-scanning operation of an example embodiment, according to the invention.

FIGS. 3A, 3B, and 3C, illustrate rear-scanning operation of an example embodiment, according to the invention.

FIGS. 4A, 4B, and 4C, illustrate operation of a saloon-style door detector configuration of an example embodiment, according to the invention.

DETAILED DESCRIPTION

A description of example embodiments follows.

The teachings of all patents, published applications and references cited herein are incorporated by reference in their entirety.

The example embodiments depicted in FIGS. 1A and 1B, and FIGS. 2A, 2B, and 2C, illustrate some basic operational concepts associated with the described embodiments of an x-ray backscatter personnel scanning system 100, according to the invention. As shown in the example embodiment depicted in FIG. 1A, an x-ray source 102, mounted in, or close to, the ceiling, creates a scanning beam of x-rays 104 lying in a plane oriented at about 45 degrees to the vertical 106. While the example embodiments described herein have the x-ray source 102 situated in or close to the ceiling, it should be understood that alternative embodiments may situate the x-ray source high on a gantry or other structure. In general, the described embodiments situate the x-ray source 102 at a height greater than the height of the person being scanned, and at a fixed position with respect to the path of the person's movement. It should also be understood that in other embodiments, the scanning beam of x-rays 104 may lie in a plane oriented at an angle greater than, or less than, 45 degrees with respect to the vertical 106.

Figure 1A:
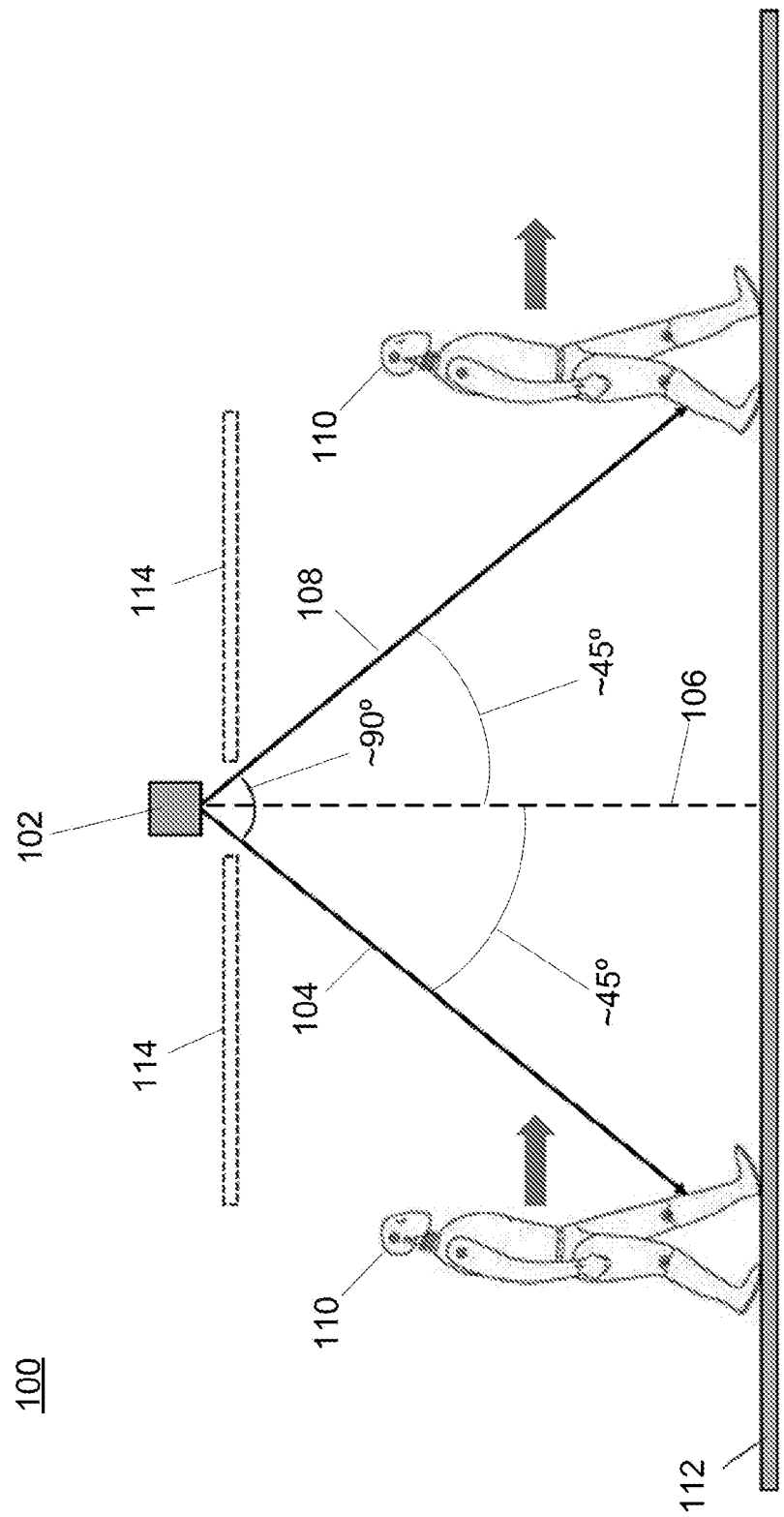
FIG. 1A illustrates basic operational concepts associated with the described embodiments, according to the invention.

The beam of x-rays 104 scans left to right (or in alternative embodiments, right to left), in the plane that is perpendicular to the plane of the page of FIG. 1A. The x-ray source 102 may additionally create a second beam of x-rays 108, also oriented at about 45 degrees to the vertical 106, but on the opposite side of the vertical 106 with respect to the first beam 104. This additional beam of x-rays 108 also scans left to right (or in alternative embodiments, right to left), in a plane perpendicular to the plane of the page of FIG. 1A. It should be understood that in other embodiments, the scanning beam of x-rays 108 may lie in a plane oriented at an angle greater than, or less than, 45 degrees with respect to the vertical 106.

Figure 1B:
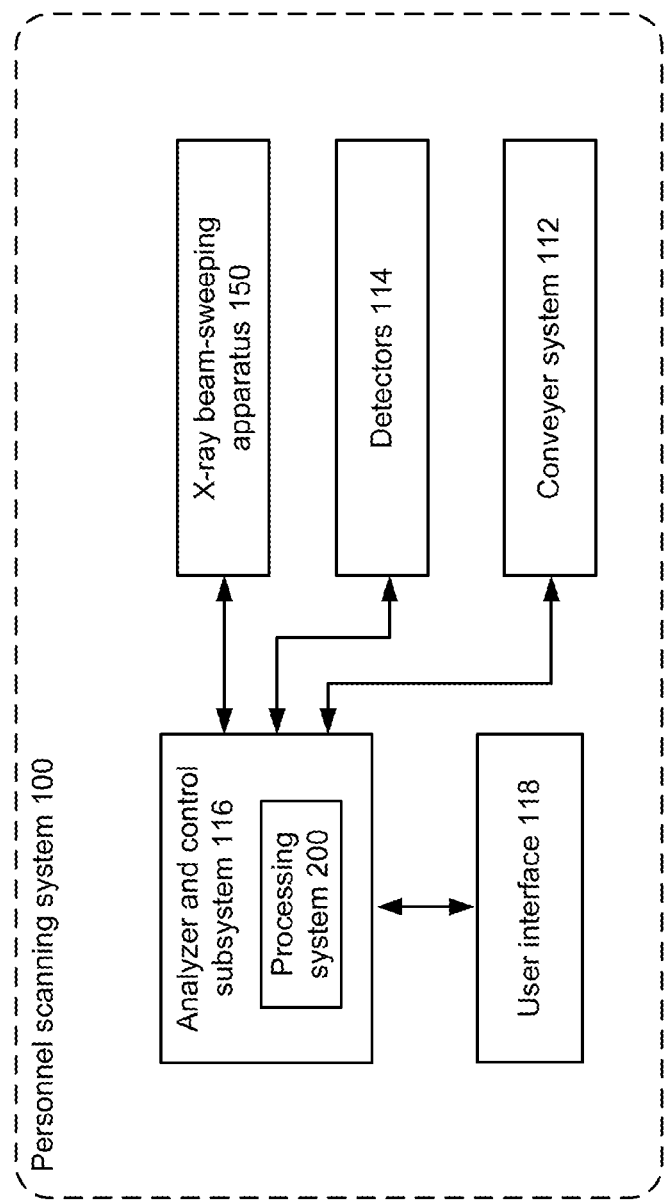
FIG. 1B illustrates a block diagram view of an example embodiment of an x-ray backscatter personnel scanning system, according to the invention.

FIG. 1B illustrates a block diagram view of an example embodiment of an x-ray backscatter personnel scanning system 100, which comprises the x-ray beam-sweeping apparatus 150, detectors 114, conveyor system 112, analyzer and control subsystem 116, and user interface 118. The analyzer and control subsystem 116 may comprise a processing system 200 as is described in more detail herein. The user interface 118 may comprise a display, user input facilities such as a keyboard, a mouse, and other such user input peripherals known in the art.

Referring to FIGS. 2A, 2B, and 2C, as the person 110 walks or is moved on a conveyor 112 through the beam 104, the beam scans left to right (or right to left), first illuminating the person's feet (as shown in FIG. 2A) and then progressing up the front of the body to the person's midsection (as shown in FIG. 2B) and finally to the person's head (as shown in FIG. 2C), as the person 110 is moved through the plane containing the scanning beam 104. In this manner, the entire front side of the person 110 is raster-scanned with the scanning x-ray beam 104. It should be understood that although the example embodiments have the person being scanned moving from left to right with respect to the fixed x-ray source 102, in alternative embodiments the person being scanned may be moved from right to left with respect to the fixed x-ray source 102.

Large-area backscatter detectors 114 may be positioned on (or close to) the ceiling (as shown in the example embodiment depicted in FIGS. 2A, 2B, and 2C), or on the sides of the conveyor 112 (not shown), to detect x-rays scattered out of the scanning x-ray beam 104 by the person 110. Additional backscatter detectors can also be placed under the conveyor 112, with the requirement that no material that would absorb too many of the scattered x-rays is used in the construction of the conveyor. For example, the load-bearing material used in the conveyor could consist of carbon fiber panels or thin aluminum. The described embodiments integrate the intensity of the detected backscattered x-rays over a time period referred to herein as "the pixel integration time." This integrated intensity is recorded as a function of the position of the scanning beam 104 as it scans across the plane containing the scanning beam 104 (i.e., a plane perpendicular to the plane of the page of the figure).

In an example embodiment, the pixel integration time may be chosen such that there are 512 integration periods during a single sweep of the x-ray beam 104 from left to right in the plane perpendicular to the page of the figure. Each of these measured intensities, when normalized, corresponds to the grayscale value of one pixel in the backscatter image. As the person 110 walks or is otherwise moved through the plane containing the scanning beam 104, a complete two-dimensional backscatter image of the front of the person, with 512 pixels per image line, is created.

Referring now to FIGS. 3A, 3B, and 3C, as the person 110 walks or is otherwise moved further to the right on the conveyor 112, the person passes through a second beam plane containing the scanning beam 108 produced by the same x-ray source 102 as shown in FIGS. 2A, 2B, and 2C. In alternative embodiments, the second scanning beam may be produced by a second x-ray source. This second beam plane containing the second x-ray beam 108 is also oriented at about 45 degrees to the vertical 106, but on the opposite side of the vertical 106 with respect to the beam plane containing the first beam 104. The x-ray beam 108 scans left to right (into the plane of the page), first illuminating the person's head (as shown in FIG. 3A), and then progressing down the rear of the body to the person's midsection (as shown in FIG. 3B), and finally to the person's feet (right), as the person 110 is moved from the left to the right through the plane containing the scanning x-ray beam 108. In this manner, the entire rear side of the person is raster-scanned with the scanning x-ray beam 108.

Large-area backscatter detectors 114 are positioned on (or close to) the ceiling, or on the sides of the conveyor 112, to detect x-rays scattered out of the scanning x-ray beams (104 and/or 108) by the person 110. A backscatter image of the rear of the person 110 may be created from the detected backscatter x-ray intensities in the same way as is done for the front of the person. In the example embodiments, the front and rear of the person being inspected are scanned. It should be noted, however, that in alternative embodiments other sides of the person being inspected may be scanned. In other words, in alternative embodiments the scanning beam may be incident on the person from other directions or orientations other than front and back.

The backscatter detectors 114 may be mounted above the person, on either side of the person, and/or within or under the conveyor 112. In alternative embodiments, the backscatter detectors 114 may be mounted on "saloon-style" doors that are situated in a closed position 120 in front of the person 110 to provide additional detector area for acquisition of the front image, and which may be moved to an open position 122 by rotating the doors about an axis 124 after the image is acquired to allow the person through. The detectors in such saloon-type doors may be used instead of, or in addition to, the other sensors described herein.

In FIGS. 4A and 4B, these detectors in saloon-type doors are shown side-on in the closed and active position 120, and the detectors swing into the open position 122 as shown in FIG. 4C, to allow the person 110 to pass through unimpeded. The described detectors in saloon-type doors may also be used as a gating feature of an example embodiment of the scanning system 100, impeding further progress of the person 110 being scanned if a threat item (e.g., a gun, knife or other contraband item) is detected. The arrow 126 in FIG. 4C indicates that the detector rotates about the axis 124 indicated by the vertical dashed line, transitioning the detectors from the closed and active position 120 to the open position 122. The detector in the open position 122 lies in a plane parallel to the direction of the conveyor motion, and along the side of the conveyor or walkway. Similar backscatter detectors may also be mounted on "saloon-style" doors behind the person, to provide additional detector area for acquisition of the rear image. Alternative embodiments may position a combination of backscatter detectors of any size in whichever locations are needed to maximize the intensity of the detected backscattered x-rays, or otherwise satisfy requirements of the detection system.

Figure 5:
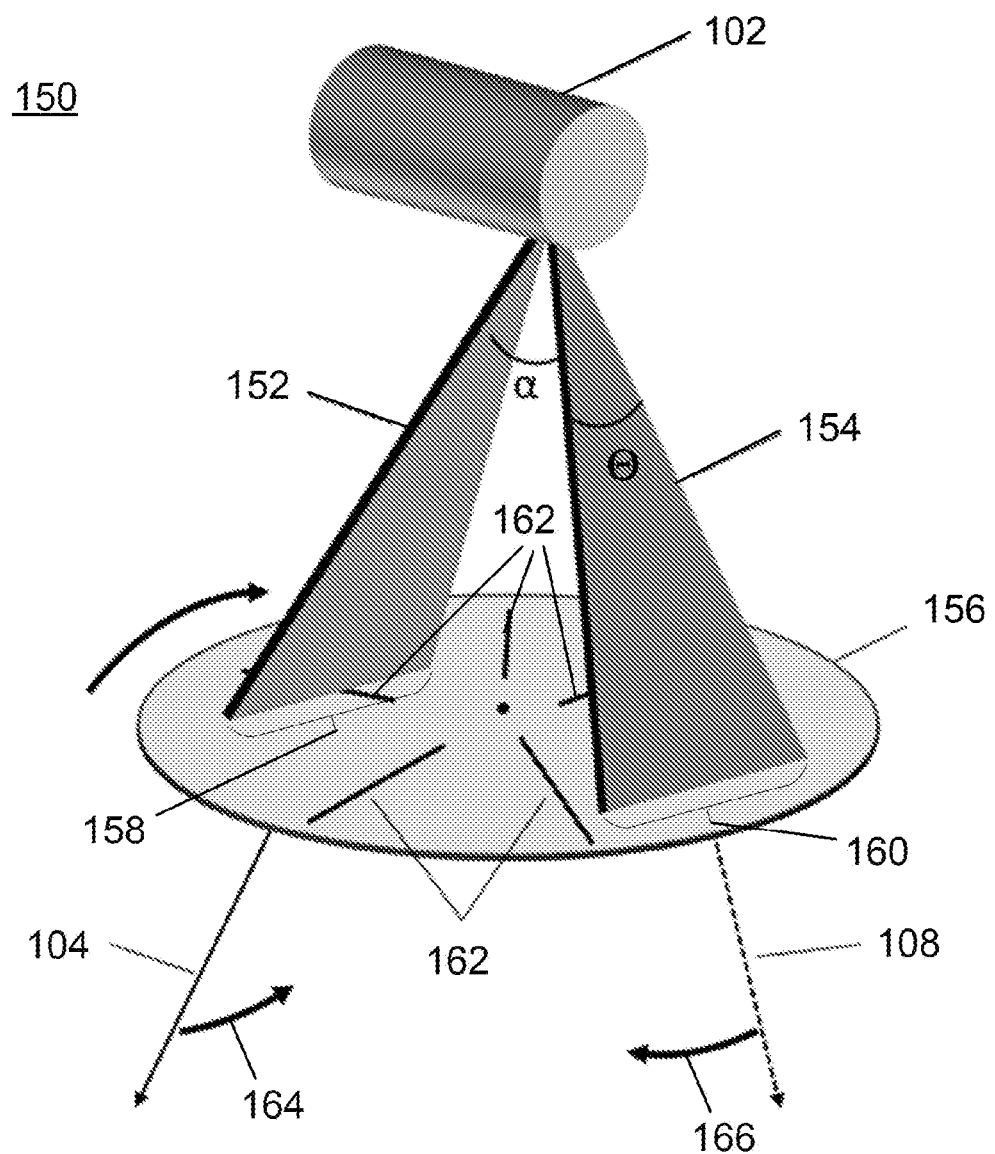
FIG. 5 shows an example embodiment of an x-ray apparatus for generating x-ray beams, according to the invention.
Figure 6:
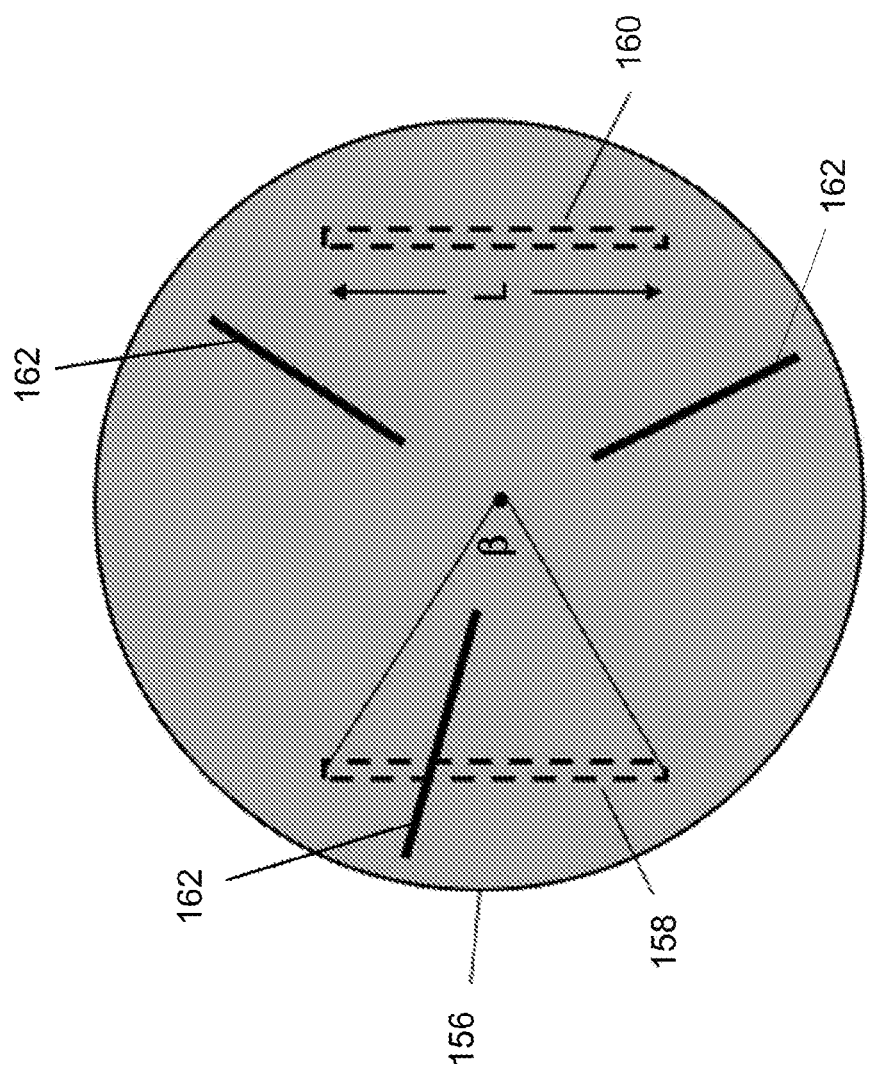
FIG. 6 shows an example chopper disk and illumination strips of an example embodiment, according to the invention.

FIG. 5 shows an example embodiment of an x-ray beam sweeping apparatus 150 for generating the sweeping x-ray beams 104 and 108 described herein. In this example embodiment, two x-ray fan beams 152 and 154 are extracted from the x-ray source 102 and directed to illuminate an x-ray opaque rotating chopper disk 156. The two fan beams 152 and 154 are separated by an angle $\alpha$, and each fan beam is distributed across an angle $\Theta$. The two fan beams 152 and 154 create two illumination strips on the chopper disk 156, shown more clearly in FIG. 6 as the two dashed rectangular regions 158 and 160. The chopper disk 156 comprises a number of slits 162, equally distributed about an axis of rotation of the chopper disk 156. As the slits 162 move into the illuminated regions 158 and 160, the x-rays from the source 102 pass through the slits 162 in the opaque chopper disk 156, creating the pencil beams of x-rays 104 and 108 on the opposite side of the chopper disk 156. As the chopper disk 156 rotates about its central rotation axis, the x-ray beams 104 and 108 sweep essentially in a plane perpendicular to the plane of the figure page (the solid arrows 164, 166, indicate the direction of scanning of the pencil beams 104, 108, as the disk rotates). In FIG. 5, pencil beam 104 is shown as a solid line, as there is shown a slit 162 currently illuminated by fan beam 152. Since there is no slit being illuminated by fan beam 154, pencil beam 108 is shown as a dashed line, as it is not active until the chopper disk 156 rotates sufficiently such that there is a slit 162 in illuminated region 160.

For backscatter imaging with multiple beams, it may be important to ensure that the beams are temporally interleaved, which means that only one beam is active at any given time. Temporal interleaving of the beams avoids cross-talk between the beams. If the beams were to be illuminated simultaneously, the backscatter detectors 114 may receive scatter from both the beams, and it may be difficult, if not impossible, to differentiate the signals from the two beams in the backscatter images. By choosing an odd number of equally-spaced slits 162 in the opaque chopper disk 156, it can be arranged so that only one slit 162 is ever being illuminated at any given moment by fan beams 152 and 154 depicted in FIG. 5. That is, only one slit 162 ever lies in illuminated regions 158 or 160 at any given time. The length L of the two illumination regions 158 and 160 is determined from the angle $\theta$, which is the angle the illuminated region subtends at the center of the chopper disk 156. The described embodiments require that:

$$\beta(\text{deg}) < 180/N_{slits},$$

where $N_{slits}$ is the odd number of slits 162 in the chopper disk 156, which ensures that only one slit 162 is in an illuminated region 158, 160, at any given time. For example, for a chopper disk with 3 slits, the angle β is required to be less than 60 degrees, and for a chopper disk with 5 slits, the angle β is required to be less than 36 degrees. By making β significantly smaller than these limits, there will be periods when neither pencil beam 104, 108, is active. Only one beam, however, will ever be active at a given time, thereby temporally interleaving the beams 104, 108.

By designing the chopper disk 156 with the required number of slits 162, and adjusting the size of the incident fan beams 152 and 154 so that the angle β subtended by the illumination areas 158 and 160 is constrained by the equation above for β, the two sweeping pencil beams 104 and 108 will be alternately activated, allowing front and rear scans to be acquired simultaneously, without any crosstalk between the images, as described herein.

Figure 7:
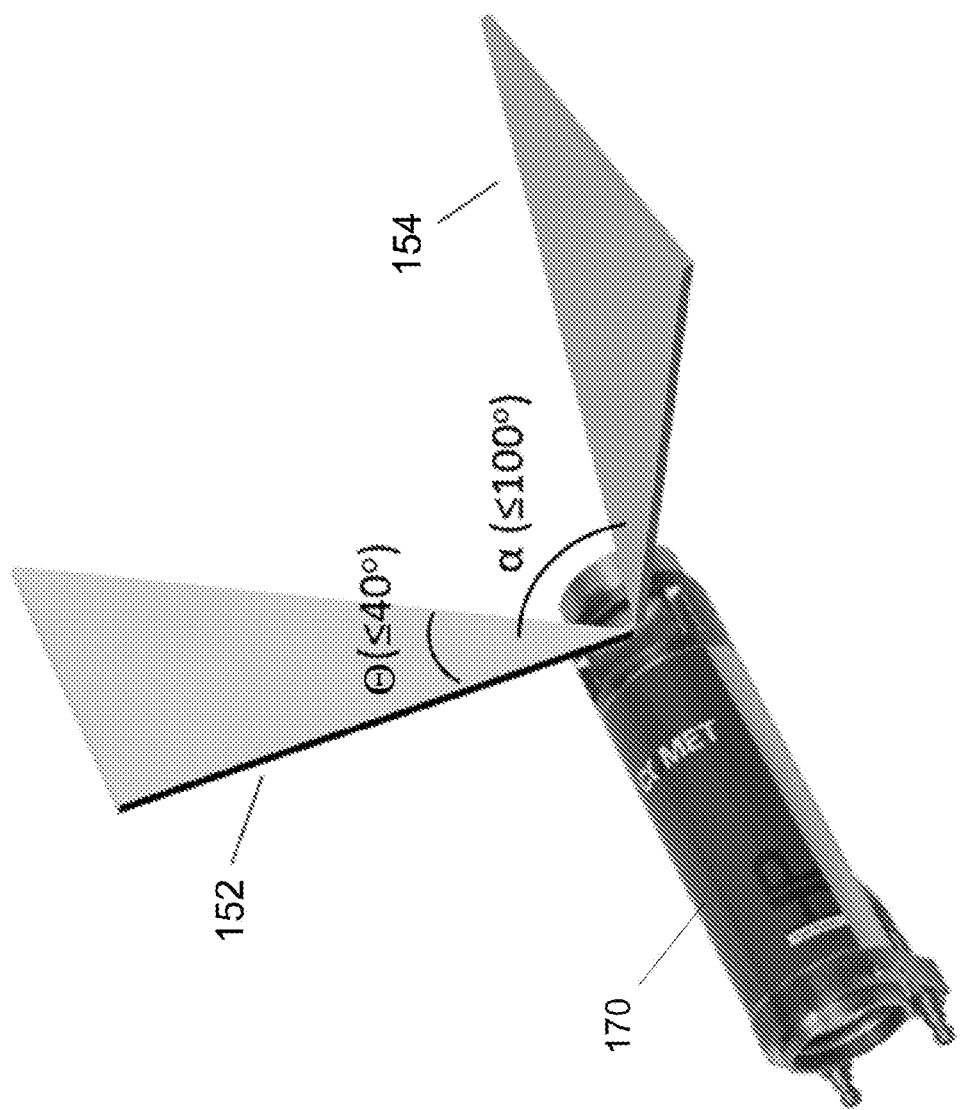
FIG. 7 shows an example x-ray tube, suitable for use in the described embodiments.

Example embodiments of a personnel scanning system as described herein may utilize an x-ray tube operating in the range of 70 kV to 220 kV. The x-ray tube used in the source 102 should have an output radiation coverage sufficient to produce the two fan beams 152 and 154 shown in FIG. 5. As previously specified, the angle α between the two fan beams is about 90 degrees, providing the two beams that are about 45 degrees from the vertical 106, but pointing in opposite directions with respect to vertical 106 as shown in FIG. 1A. The angular range β through which each of the sweeping pencil beams 104 and 108 sweep can be in the range of 20 to 40 degrees for a ceiling mounted source. For example, if the source is 8 feet from the floor, then Θ should be approximately 26 degrees. This value of Θ provides a scan width of about 65 inches at the floor (feet area), and a scan width of about 18 inches at a height of 6 feet (head area). For this example, the radiation output of the tube must cover at least 90°×26°. X-Ray tubes with this size of radiation output coverage are readily available in the voltages required. For example, the 90 kV Comet MXR-100 HP x-ray tube 170 shown in FIG. 7 has a radiation coverage of 100°×40°, which is sufficient for the previous example that requires 90°×26° coverage.

The described embodiments also facilitate transmission images to be acquired simultaneously with the backscatter images. By positioning a transmission detector under the floor of the conveyor, the x-rays that are transmitted through or around the person can be detected.

For personnel scanning, this is particularly useful for detecting metallic weapons (such as guns and knives) being carried on the side of a person. When a metallic weapon or other object is carried on the side of a person being scanned, there is only air around the metallic object. Therefore, there is no bright, highly scattering background such as the person's body against which the darker, attenuating object can be viewed, which makes it difficult to see such objects in the backscatter images. In a transmission image, however, these metallic objects absorb the x-rays and they therefore appear as clearly visible dark objects compared to the air background, which does not absorb the x-rays and therefore appears bright. Note that only one transmission detector is required, and it can be placed under the floor or conveyor to intercept the transmitted intensity of either of the two sweeping pencil beams 104 or 108.

Figure 8:
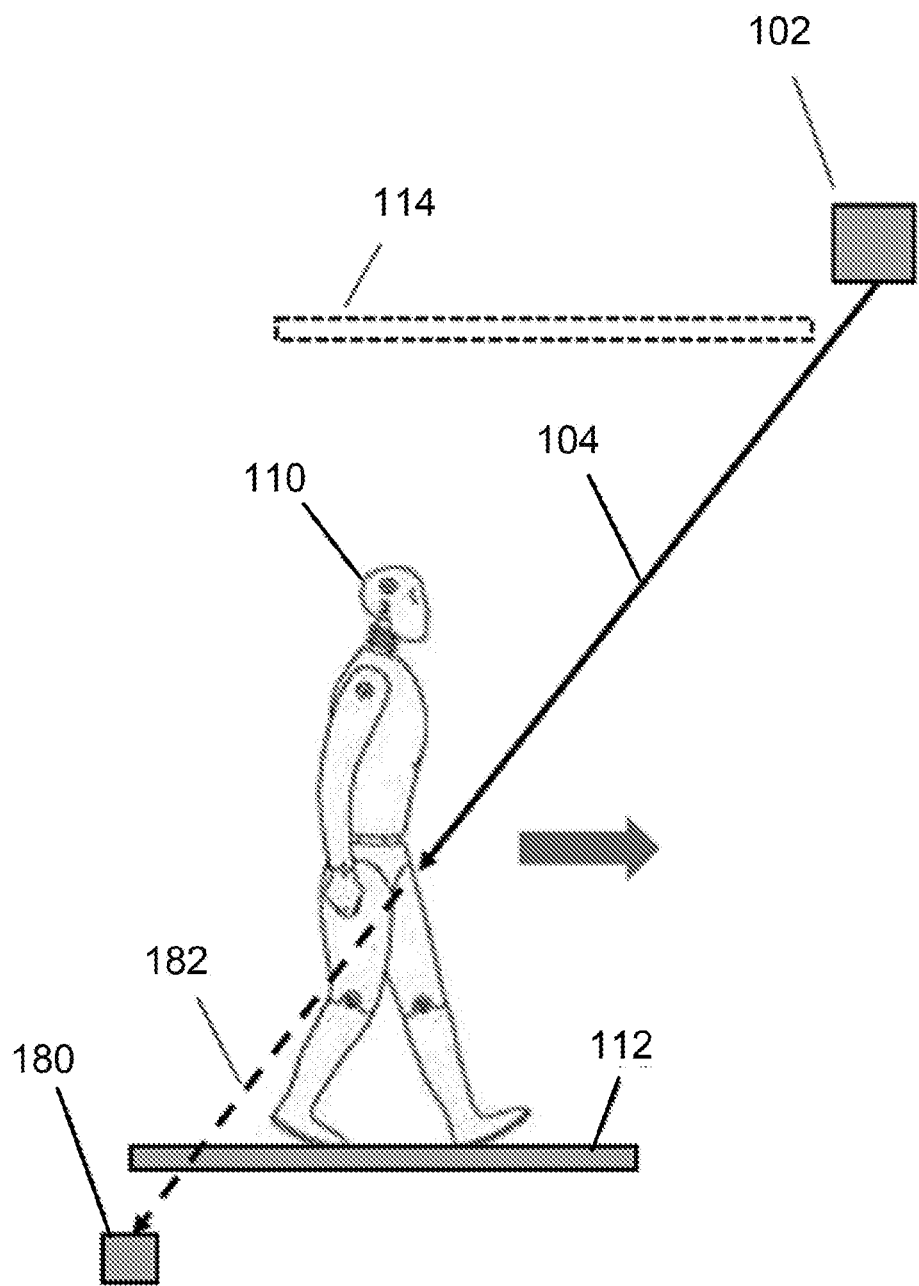
FIG. 8 illustrates transmission-scanning operation of an example embodiment, according to the invention.

In FIG. 8, an example system is shown in which a transmission detector 180 has been placed under the conveyor 112 to intercept sweeping beam 104, and to measure the transmitted intensity of transmitted beam 182 that has passed through person 110. Note that transmission detector 180 must extend the full width of the scan (into the plane of the figure page) so that the detector 180 can intercept the sweeping transmission beam 182 through its entire angular range.

The transmission detector 180 may be a single channel detector, such as a piece of plastic scintillator read out with Photomultiplier Tubes (PMTs). The transmission detector 180 may alternatively consist of scintillator sheets read out by wavelength-shifting fibers and PMTs, or some other detection device for detecting the scintillation light. It may also consist of a solid-state detector, such as cadmium telluride (CdTe), but this type of detector is generally too expensive to be used for personnel scanning system applications. The transmission detector 180 may be single energy (grayscale intensity imaging), or it may be a dual-energy detector. A dual-energy detector may facilitate certain types of material discrimination and associated colorized transmission images as known by those skilled in the art. It should be noted that prior art personnel scanning systems implement a moving source, so such systems either require a transmission detector which moves in a coordinated fashion with the source (introducing added cost and complexity) or transmission detectors that are so large that they can intercept the scanning beam on the far side of the person, regardless of the source position.

Figure 9:
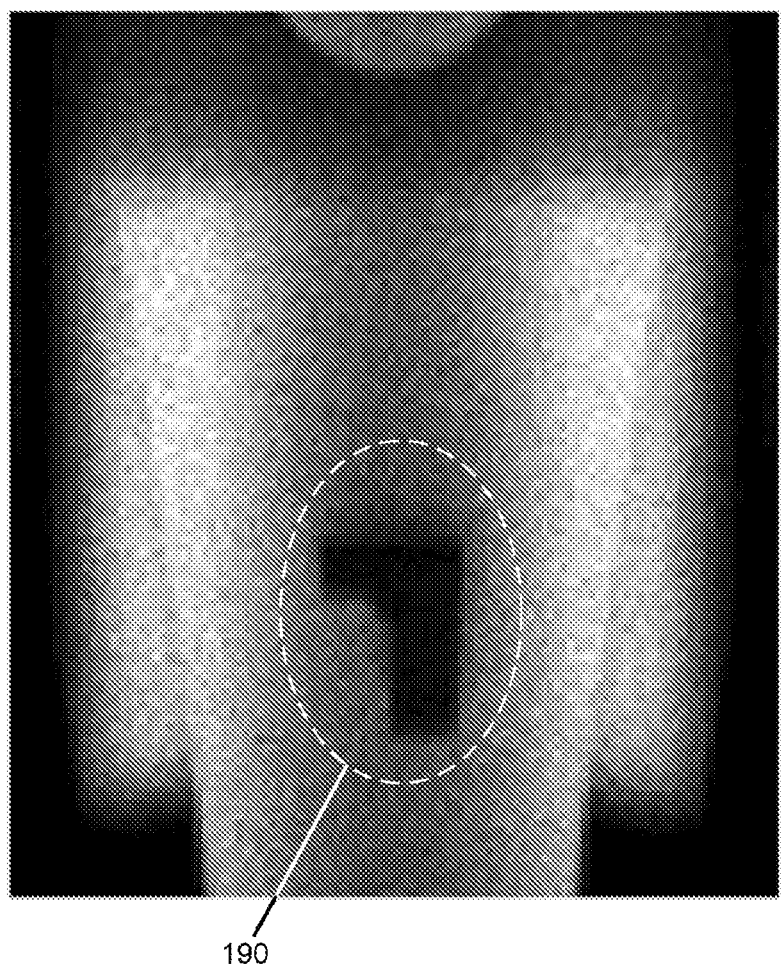
FIG. 9 shows a computer simulated backscatter image of a gun placed on a human phantom.

Computer simulations using the GEANT modeling package from CERN have been carried out to demonstrate the concept feasibility of the described embodiments. FIG. 9 shows a computer simulated backscatter image of a gun 190 placed on a human phantom, for a pass-through speed of about 1 m/second, with a 100 Watt, 120 kV x-ray source mounted 8 feet above the ground. The system uses a disk with 5 slits, and a pencil beam (oriented at 45 degrees to the vertical) sweeping over an angular range of 26 degrees. In the simulation, two 18"×66" inch saloon-style detectors were used.

Figure 10A:
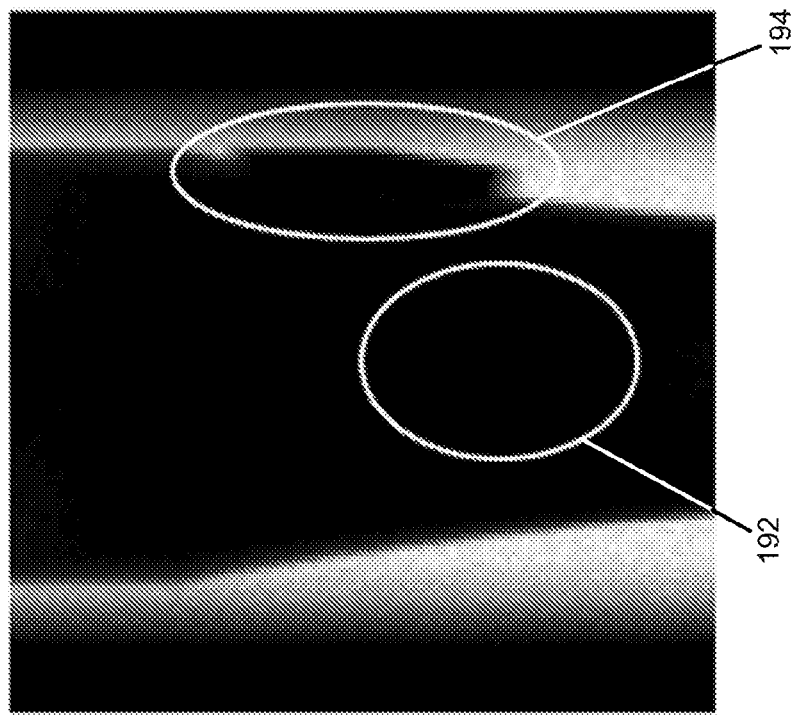
FIGS. 10A and 10B show a computer-generated backscatter image of a gun in front and on the side of a human phantom, and a corresponding transmission image.
Figure 10B:
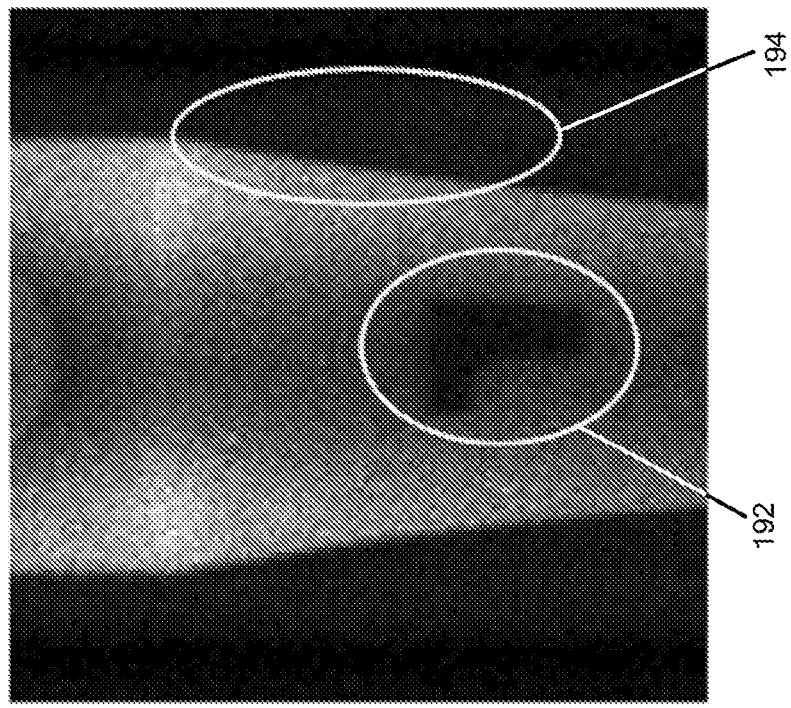

FIGS. 10A and 10B show a computer-generated backscatter image of a first gun 192 in front of a human phantom and a second gun 194 on the side of a human phantom (FIG. 10A) and a corresponding transmission image (FIG. 10B). Note that the two images complement each other. The backscatter image in FIG. 10A clearly shows the gun on the front but not the side, while the transmission image in FIG. 10B shows the gun on the side but not the front. In an example embodiment, the computer-generated backscatter image may be generated by a processor and a memory with computer code instructions stored thereon. The memory may be operatively coupled to the processor such that, when executed by the processor, the computer code instructions cause the system to produce a scatter image of the scattering material based at least on the scattered radiation signal produced by the backscatter detectors.

Figure 11:
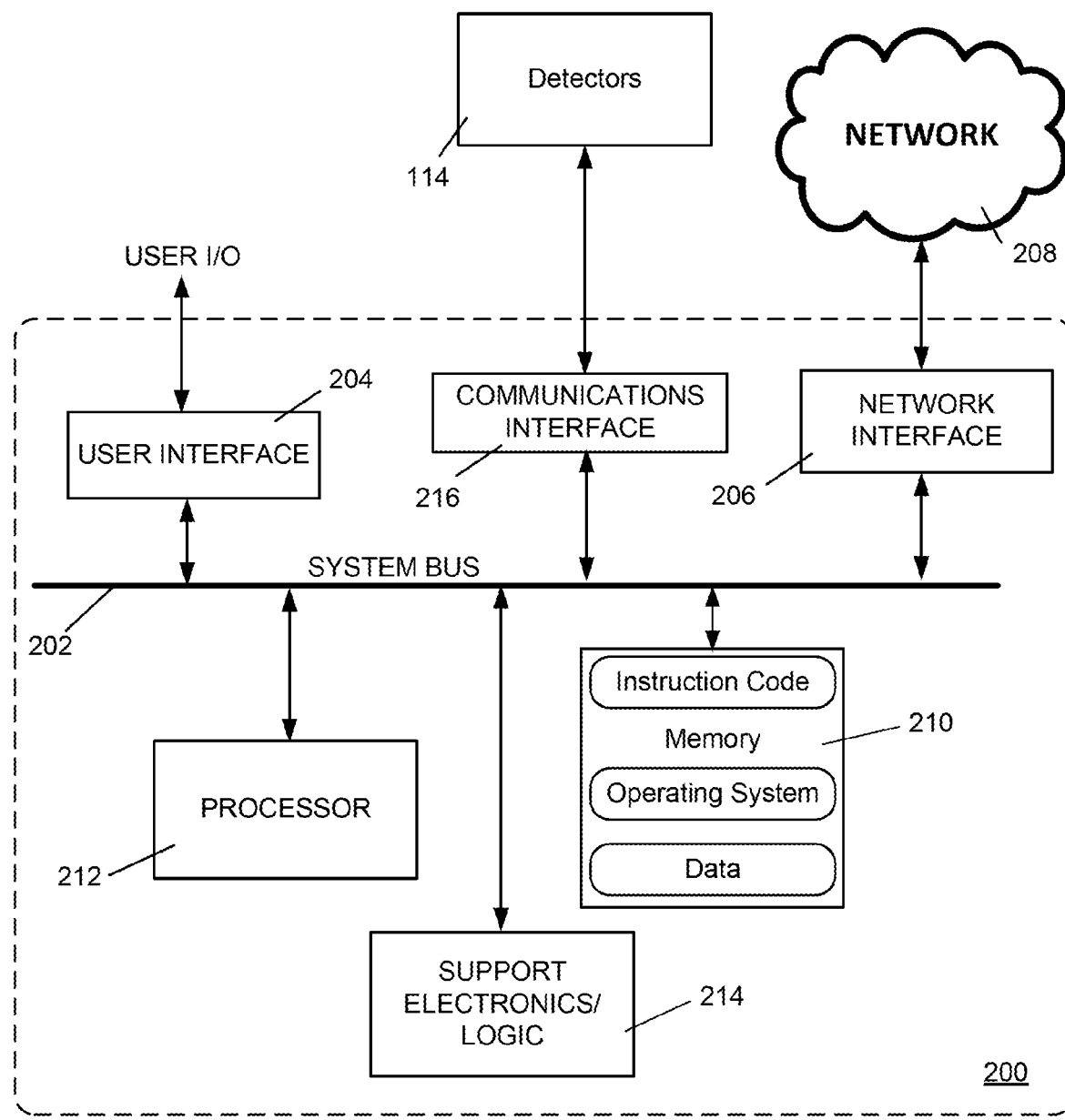
FIG. 11 is a diagram of an example internal structure of a processing system that may be used to implement one or more of the embodiments herein.

FIG. 11 is a diagram of an example internal structure of a processing system 200 that may be used to implement one or more of the embodiments herein. Each processing system 200 contains a system bus 202, where a bus is a set of hardware lines used for data transfer among the components of a computer or processing system. The system bus 202 is essentially a shared conduit that connects different components of a processing system (e.g., processor, disk storage, memory, input/output ports, network ports, etc.) that enables the transfer of information between the components.

Attached to the system bus 202 is a user I/O device interface 204 for connecting various input and output devices (e.g., keyboard, mouse, displays, printers, speakers, etc.) to the processing system 200. A network interface 206 allows the computer to connect to various other devices attached to a network 208. Memory 210 provides volatile and non-volatile storage for information such as computer software instructions used to implement one or more of the embodiments of the present invention described herein, for data generated internally and for data received from sources external to the processing system 200.

A central processor unit 212 is also attached to the system bus 202 and provides for the execution of computer instructions stored in memory 210. The system may also include support electronics/logic 214, and a communications interface 216. The communications interface may receive a detection signal from the detectors 114, as described with reference to, for example, FIG. 1B.

In one embodiment, the information stored in memory 210 may comprise a computer program product, such that the memory 210 may comprise a non-transitory computer-readable medium (e.g., a removable storage medium such as one or more DVD-ROM's, CD-ROM's, diskettes, tapes, etc.) that provides at least a portion of the software instructions for the invention system. The computer program product can be installed by any suitable software installation procedure, as is well known in the art. In another embodiment, at least a portion of the software instructions may also be downloaded over a cable communication and/or wireless connection. Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

It should be understood that the concept disclosed in this application of oblique scanning beams imaging a person as they move through the system is only one example of use of such a system. It should be understood that the invention could be used to image any object passing through the system. The location of the x-ray source on the ceiling is just another specific example of a system geometry. Those skilled in the art will understand that numerous other system geometries are within the scope of the invention.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

While example embodiments have been particularly shown and described, it will be understood by those skilled in the art that various changes in form and details may be made therein without departing from the scope of the embodiments encompassed by the appended claims.

What is claimed is:

1. An inspection system, comprising:
a scanning region configured to accommodate a scan subject, an exterior of the scan subject being characterized by a contour, the scanning region including a pathway along which the scan subject passes during an inspection scan, a continuum of contours of the scan subject is defined as the scan subject moves along the pathway from a starting location on the pathway to an ending location on the pathway;
an x-ray source, disposed in a fixed position with respect to the scanning region, configured to generate one or more scanning x-ray beams, each of the one or more scanning x-ray beams within a plane that is oriented at a fixed projection angle with respect to vertical, and incident obliquely on either (i) a front of the scan subject contours between the starting location on the pathway and a middle location on the pathway that is between the starting location on the pathway and the ending location on the pathway, or (ii) a rear of the scan subject contours between the middle location on the pathway and the ending location on the pathway, a first one of the scanning x-ray beams is incident obliquely on the front of the scan subject contours between the starting location and the middle location, and a second one of the x-ray scanning beams is incident on the rear of the scan subject contours between the middle location and the ending location, the x-ray source comprises a single x-ray generating element that produces both the first one of the scanning x-ray beams and the second one of the x-ray scanning beams;
one or more backscatter detectors arranged to detect radiation scattered from the scan subject, and to produce a scattered radiation signal therefrom; and
a controller to create at least one scatter image of the scan subject based at least on the scattered radiation signal.

2. The system according to claim 1, wherein the first scanning x-ray beam and the second scanning x-ray beam are temporally interleaved.

3. The system of claim 1, wherein the x-ray generating element comprises an x-ray tube.

4. The system according to claim 1, wherein a chopper disk is used to create the one or more scanning x-ray beams.

5. The system according to claim 4, wherein the chopper disk comprises an odd number of slits and wherein regions of the chopper disk illuminated by x-rays are configured to cooperate with the slits to facilitate temporal interleaving of the one or more scanning x-ray beams.

6. The system according to claim 1, further comprising a conveyor configured to move the scan subject through the one or more scanning x-ray beams, thereby causing a scan of the scan subject to occur.

7. The system of claim 1, wherein the scan subject is a person.

8. The system according to claim 7, further comprising one or more constraints configured to cause the person to walk through the one or more scanning x-ray beams, thereby causing a scan of the person to occur.

9. The system according to claim 1, wherein a transmission detector measures a transmitted intensity of at least one of the one or more scanning x-ray beams.

10. The system according to claim 1, wherein the at least one of the one or more backscatter detectors is disposed across the pathway during scanning, and is disposed outside of the pathway after scanning completes.

11. The system according to claim 1, wherein the controller comprises a processor and a memory with computer code instructions stored thereon, the memory operatively coupled to the processor such that, when executed by the processor, the computer code instructions cause the system to create the scatter image based on the scattered radiation signal, and to analyze the scatter image to detect presence of a threat item.

12. A method of inspecting a scan subject, the method comprising:
generating, by an x-ray source disposed in a fixed position with respect to the scan subject, one or both of (i) a first scanning x-ray beam and (ii) a second scanning x-ray beam, the first scanning x-ray beam configured to be incident obliquely on the scan subject from a first direction, and the second scanning x-ray beam configured to be incident obliquely on the scan subject from a second direction, each of the first scanning x-ray beam and second x-ray beam being within a plane that is oriented at a fixed projection angle with respect to vertical;
generating the first scanning x-ray beam and the second x-ray scanning beam using a single x-ray generating element;
causing the scan subject to pass through the first scanning x-ray beam such that as the scan subject moves, (i) the first scanning x-ray beam intersects the scan subject from the first direction beginning at the bottom portion of the scan subject and progresses upwards on the scan subject, and (ii) the second scanning x-ray beam intersects the scan subject from the second direction beginning at the top portion of the scan subject and progresses downwards on the scan subject;
detecting, by one or more backscatter detectors, radiation scattered from the scan subject, and producing a scattered radiation signal therefrom; and
creating a scatter image of the scan subject based at least on the scattered radiation signal.

13. The method of claim 12, further comprising temporally interleaving the first scanning x-ray beam and the second x-ray scanning beam.

14. The method of claim 12, wherein the x-ray generating element is an x-ray tube.

15. The method of claim 12, further comprising generating the one or more scanning x-ray beams using a chopper disk.

16. The method of claim 12, further comprising moving the scan subject through the first and second scanning x-ray beams on a conveyor, thereby causing a scan of the scan subject to occur.

17. The method of claim 12, wherein the scan subject is a person, and further comprising causing the person to walk through the first and second scanning x-ray beams, thereby causing a scan of the person to occur.

18. The method of claim 12, further comprising measuring a transmitted intensity of at least one of the first scanning x-ray beam and the second scanning x-ray beam.

19. The method of claim 12, further comprising analyzing the scatter image to detect presence of a threat item.

\* \* \* \* \*